Inventor
MOORE M. REYNOLDS
Attorney

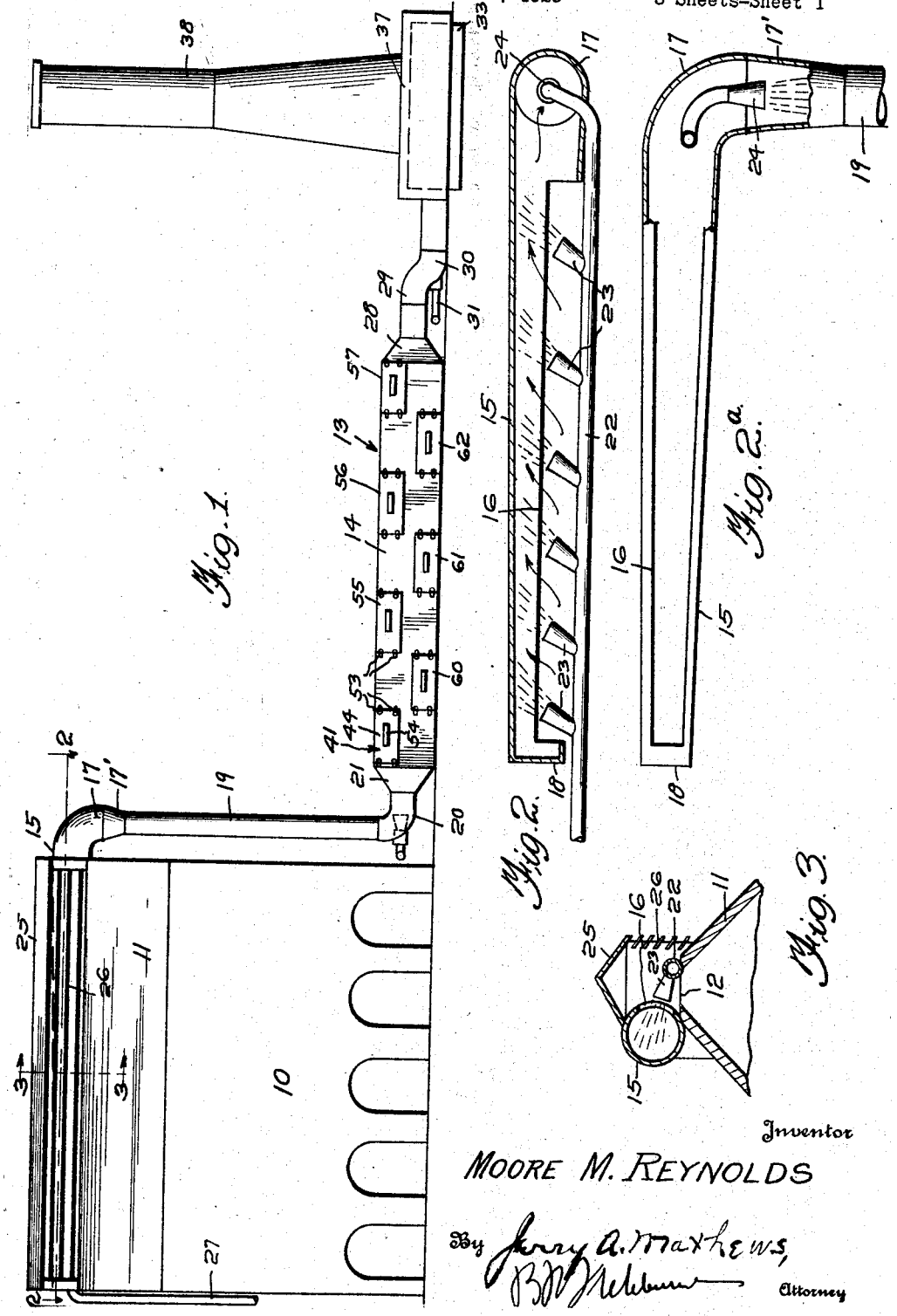

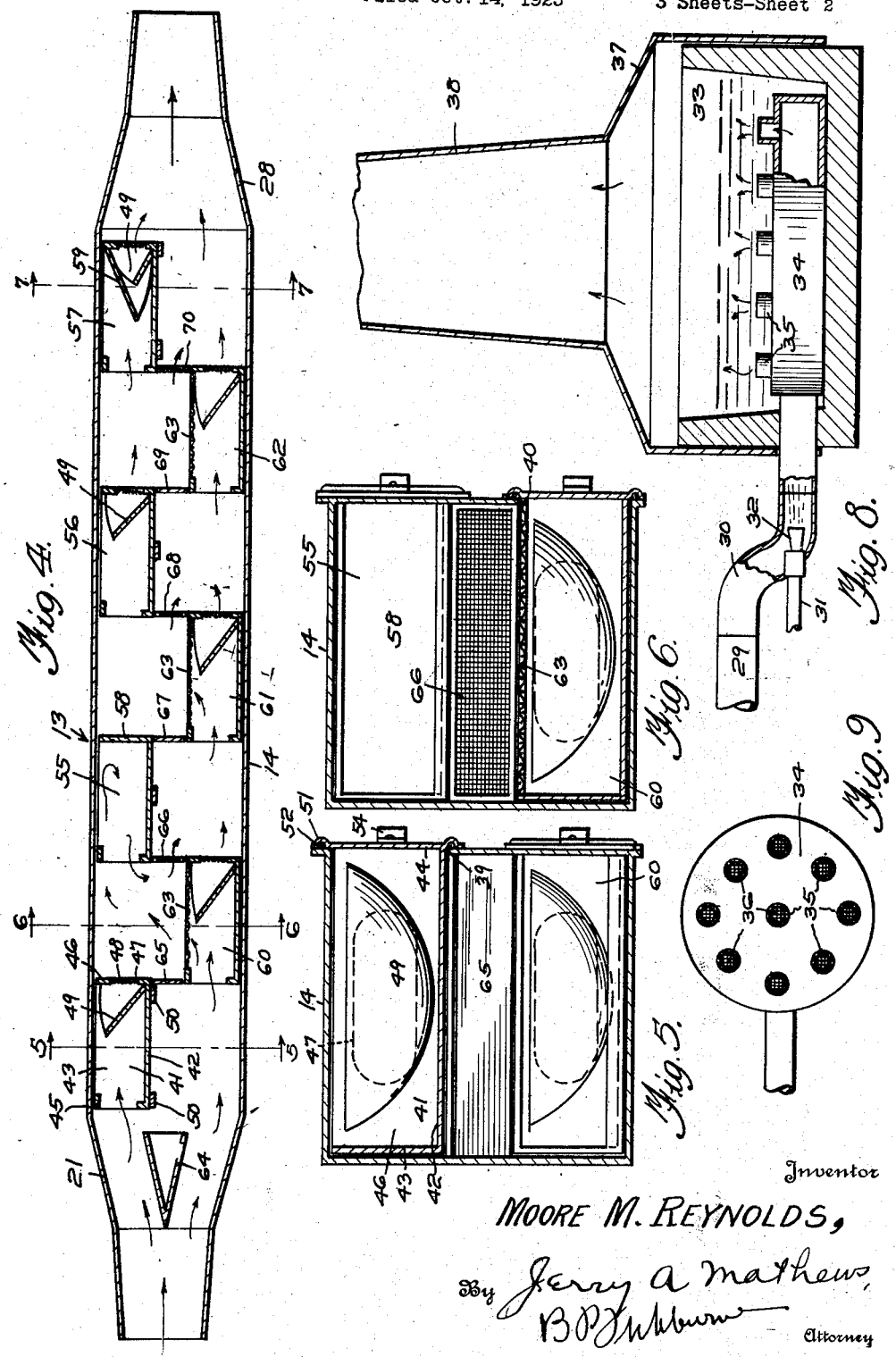

Patented Apr. 5, 1927.

1,623,636

UNITED STATES PATENT OFFICE.

MOORE M. REYNOLDS, OF DAWMONT, WEST VIRGINIA.

GAS-SEPARATING APPARATUS.

Application filed October 14, 1925. Serial No. 62,459.

My invention relates to means for arresting and filtering out from smoke and gases of metallurgical furnaces, smelters, retorts, roasters, furnaces or the like, solid particles, which are objectionable or injurious, when allowed to escape to the atmosphere.

An important object of the invention is to provide an apparatus of the above mentioned character, which is particularly well adapted for use in connection with zinc furnaces, while not necessarily restricted to this use.

A further object of the invention is to provide means to thoroughly and effectively filter out from the smoke or gases, any or all fine or minute particles, and to collect the same.

A further object of the invention is to provide means of the above mentioned character, embodying a separating apparatus, so constructed that the solid particles are collected in receptacles or trays, arranged to receive the particles which have their fineness increasing in successive order.

A further object of the invention is to provide an apparatus of the above mentioned character, which will not only separate out and collect the solid particles, but will also prevent the escape of injurious gases, whereby substantially pure oxygen is discharged to the atmosphere.

Other objects and advantages of the invention will be apparent by the following description:

As is well known, the smoke or gases from zinc furnaces, and other metallurgical furnaces, when allowed to escape to the atmosphere, are very injurious to both plant and animal life. This is due largely to the fact that such smoke or gases contain poisonous chemicals, in both the solid and gaseous state. These gases contain fine particles of injurious chemicals, which settle in the atmosphere and become deposited upon the vegetable life and also injuriously affect animals, such as cattle and live stock. These gases often travel several miles from the furnaces, and descend upon the surrounding country.

The principal trouble heretofore encountered in attempting to prevent the escape of the poisonous gases, is the difficulty in collecting out the solid chemicals due to the fact that they are present in such minute particles. Attempts have been made to solve the problem by means of electrical apparatus, which subjects these minute particles to the action of an electrical discharge, thereby tending to effect the precipitation of the particles. The expense of the installation and operation of this electrical apparatus, has prohibited its extensive use.

In accordance with my invention, I take the gases or smoke containing fine solid chemical particles, and introduce the same into a pipe or conduit, while subjecting the same to the action of dampened steam. This steam is preferably employed to effect the travel of the gases into and through the pipe. These gases are then discharged into and pass through a separating apparatus, wherein the solid particles are effectively separated out from the gases or smoke. These solid particles are collected in receptacles or trays, arranged in successive order, and the fineness of the collected particles increases toward the discharge end of the separator. The gases which pass from the separator are substantially free from injurious or poisonous solid particles, but may contain injurious gases, and the gas is then passed into a washing tank, and there chemically treated, whereby the injurious or poisonous substances of the gases are removed, and substantially pure oxygen finally discharged from the stack.

In the accompanying drawings forming a part of this specification, and in which like numerals are employed to designate like parts throughout the same:

Figure 1 is a side elevation of apparatus embodying my invention,

Figure 2 is a horizontal section taken on line 2—2 of Figure 1, parts omitted,

Figure 10:
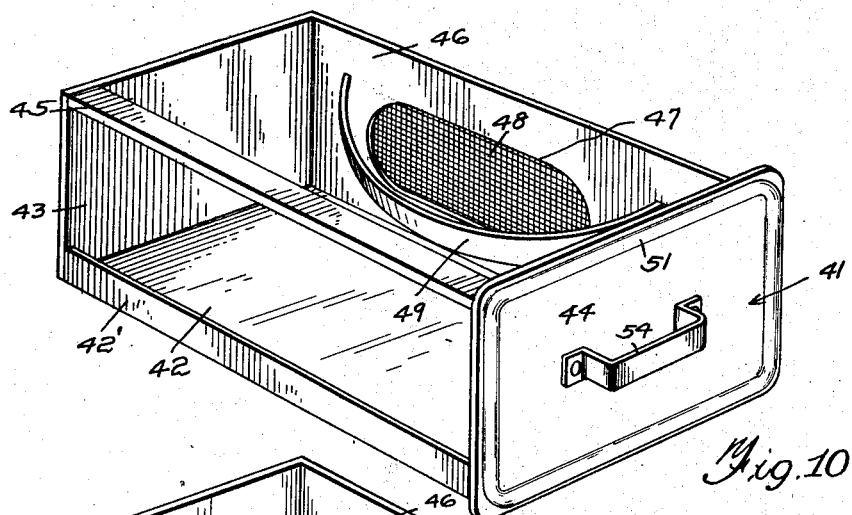
Figure 11:
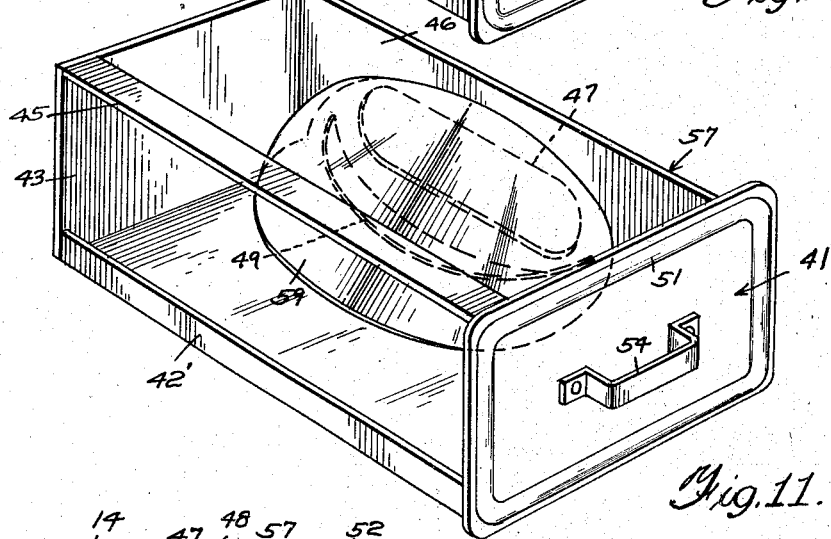
Figure 7:
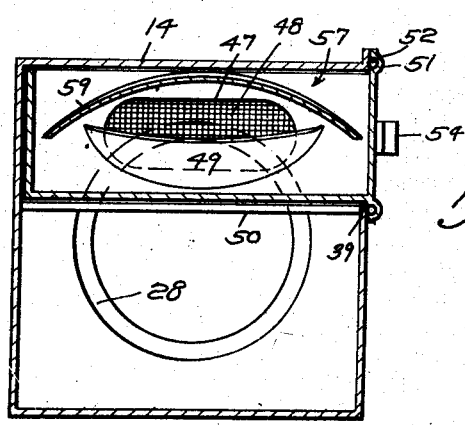

Figure 2$^a$ is a side elevation of the intake pipe, parts in vertical section,

Figure 3 is a transverse section taken on line 3—3 of Figure 1,

Figure 4 is a central vertical longitudinal section through the separator,

Figure 5 is a transverse section taken on line 5—5 of Figure 4,

Figure 6 is a similar view taken on line 6—6 of Figure 4,

Figure 7 is a transverse section taken on line 7—7 of Figure 4,

Figure 8, is a central vertical longitudinal section through the chemical tank and associated elements, parts in elevation, Figure 9, is a plan view of the spraying device or nozzle of the chemical tank, Figure 10 is a perspective view of the front upper separator tray, and, Figure 11 is a similar view of the rear upper separator tray.

In the drawings, wherein for the purpose of illustration is shown a preferred embodiment of my invention, the numeral 10 designates a metallurgical furnace, such as a zinc furnace. This furnace may be of any well known or preferred type, and may have the usual gable type of roof 11, having a longitudinal opening 12, at the top apex thereof. In the ordinary zinc furnace, smoke or gases are allowed to discharge through the opening 12, to the atmosphere, and hence settle upon the surrounding country, with injurious or poisonous results to animal and plant life.

In accordance with my invention, I provide a separator 13, embodying a casing 14, which is preferably square in cross-section. The detailed description of the separator will be given hereinafter.

Arranged adjacent to and upon one side of the outlet opening 12 is an intake pipe 15, extending longitudinally of the roof 11, and suitably attached thereto. The intake pipe 15 is generally horizontally arranged and is provided upon its inner side with a longitudinal opening 16, which extends for the entire length of the opening 12. The intake pipe 15 preferably tapers longitudinally and increases in diameter forwardly as shown. The forward or large end of the intake pipe 15 is connected with an elbow 17, having the same diameter as this large end, and the elbow is connected with a tapered coupling 17', the lower reduced end of which is preferably slightly larger in diameter than the rear reduced end 18 of the pipe 15. This is provided in order that there will be no undue resistance offered to the free passage of the gases through the apparatus. Connected with the reduced end of the coupling 17', is a vertical pipe 19, having the same diameter as such reduced end, and the pipe 19 is connected with the elbow 20, which leads into the tapered end 21, of the separator casing 14. It is preferred that the cross-sectional area of the casing 14 be at least twice that of the pipe 19, while it may be considerably larger. However, the invention is not restricted to these proportions.

The numeral 22 designates a wet steam injector pipe, which extends throughout the entire length of the opening 12, opposite the opening 16, and carries discharge nozzles 23, which preferably flare toward their free ends. These nozzles 23 preferably point to the longitudinal center of the opening 16, and are therefore vertically angularly arranged. These nozzles are also disposed at an angle, with respect to the longitudinal axis of the pipe 15, and are faced toward the discharge end of the pipe. It will be seen that the smoke or gases discharging from the opening 12 will be caught in the suction or draft created by the steam escaping from the nozzles 23, and will be fed transversely through the opening 16 into the pipe 15, and then propelled longitudinally through this pipe, by virtue of the angular longitudinal travel of the steam. The pipe 22 has its rear end leading into the elbow 17, and is equipped therein with a flaring nozzle 24, discharging forwardly and aiding in the forward travel of the smoke or gases.

Covering the nozzles 23 and pipe 22 is a roof, 25, of a ventilator, one side of which is completely closed by the pipe 15, while the opposite side of the ventilator is equipped with adjustable ventilating blades or elements 26, by means of which the draft or volume of incoming air may be regulated. The pipe 22 is connected with the pipe 27, having a connection with any suitable source of steam or compressed air. It is preferred to employ wet steam although the invention is not necessarily restricted to this practice, and the wet steam may be obtained from the exhaust of an ordinary steam engine.

The rear end of the separator casing 14 has a tapered end or head 28, connected with a pipe 29, preferably of the same diameter as the pipe 19. The pipe 29 preferably embodies an elbow 30, through which an injector pipe 31 extends, carrying a flaring nozzle 32. Steam or compressed air is supplied through the pipe 31, and I preferably employ wet steam. This nozzle aids in propelling the gases in a forwardly direction.

As more clearly shown in Figures 1 and 8, the numeral 33 designates a settling or chemical tank preferably formed of concrete or the like and partly filled with water, containing quicklime. Arranged within the bottom of the tank 33 is an atomizing shell 34 having connection with the pipe 29, as shown. The top of the shell 34 is provided with spraying nozzles 35, covered with wire gauze 36 or the like, to cause the gas to pass through the water in fine sprays. A hood 37 covers the tank 33, and has connection with a stack 38, leading to the atmosphere. The shell 34 is filled with water from the tank 33. When the gases enter the shell 34, the water therein becomes saturated with these gases, and such water is sprayed upwardly through the nozzles 35, whereby the water saturated with the gases is sprayed into the water in the tank 33. This aids in the absorption of gases by the water contained in the tank 33.

The following is a detailed description of the separator 13:

The casing 14 is provided upon one side thereof with upper and lower horizontal sets of openings 39 and 40, Figures 1, 5 and 6. Removably mounted within the forwardmost upper opening 39 is a separating and collecting element or tray 41, (see Figure 10) embodying an imperforate bottom 42 and ends 43 and 44. This tray has its forward side open with the ends 43 and 44 connected by a bar 45. The rearmost side of this tray or receptacle embodies an imperforate plate 46, having an opening 47 formed therein, which is covered by a filtering or dividing material, such as wire gauze 48 or the like having a suitable gauge, such as 12 gauge. The top of this opening is spaced from the top of the plate 46. Arranged forwardly of the screen element 48 is a spherically curved deflector 49 covering the opening 47 and spaced from the top of the plate 46. The tray 41 is slidably supported by rails 50, and the top of the tray and its ends 43 are adapted to have a gas tight contact with the walls of the casing 14. The outer end 44 is provided with an outwardly bulging flange 51, for the reception of an asbestos gasket 52, to contact with the outer surface of the casing 14, to form the gastight joint. The end 44 is clamped to the casing by pivoted clamps 53, and this end carries a suitable handle 54, by means of which the tray may be shifted longitudinally.

The numerals 55, 56 and 57, designate trays, which are slidably mounted within the successive openings 39. The tray 55 is identical with the tray 41, excepting that its rear side 58 is imperforate, throughout, and the deflector 49 is omitted. The tray 56 is identical with the tray 41. The tray 57 is identical with the tray 41 excepting that this tray has a second spherically curved deflector 59, which extends over the deflector 49.

Slidably mounted within the lower openings 40 are trays 60, 61 and 62, which are identical with the tray 41, excepting that the top of these trays is covered with filtering and dividing material 63, preferably in the form of wire gauze or screen material. Attention is called to the fact that the gauge of the wire gauze or screen 48 of the tray 41 is the coarsest, and this gauge increases in fineness with each succeeding tray, in the upper and lower sets equipped with such gauze as the screen material. In each of the lower trays, the top screen 63 is of the same gauge as the screen 48 thereof. As before stated, the fineness of the straining element 48 increases rearwardly and the element 48 of the tray 57 may be 100 mesh wire gauze, or strainer cloth, or other suitable material.

It is preferred to have the fineness of the straining material increasing rearwardly or to the right, Figure 4, and the particular gauge or mesh of the strainer material or cloth may be varied, depending upon the character of the gas or smoke being treated.

The numeral 64 designates a V-shaped divider and spreader which is located in the tapered end 21 of the casing 14, and serves to divide the incoming gases into upper and lower strata. Arranged between the rear side of the pan 41 and the forward side of the pan 60, is an imperforate vertical transverse wall 65. Disposed at the rear side of the tray 60 is a transverse vertical screen or strainer 66, also positioned adjacent the forward side of the pan 55. The mesh of this screen 66 is preferably the same as that of the screen 48 of the pan 60. The numeral 67 designates a transverse vertical imperforate wall, positioned between the rear side of the pan 55 and the forward side of the pan 61. Extending between the forward side of the pan 56 and the rear side of the pan 61, is a transverse screen 68, preferably of the same mesh as the screen 48 of the pan 61. A transverse vertical imperforate wall 69 extends between the rear side of the pan 56 and the forward side of the pan 62. A transverse vertical screen 70, is arranged between the forward side of the pan 57 and the rear side of the pan 62, and the mesh of the screen 48 of the pan 62.

The operation of the apparatus is as follows:

When the apparatus is used in connection with a zinc furnace, the gases or smoke from such furnace are injected into the collecting pipe 15, by means of the injector nozzles. This smoke or gases have suspended therein solid particles in the form of zinc-oxide, lead-oxide, and metallic lead, with sulphur dioxide gas. The injection of wet steam into this smoke or gas not only serves to propel the gases and smoke into and through the collecting pipe and associated elements but dampens the solid particles in suspension therein, aiding in their precipitation. As the smoke or gases enter the forward end of the casing 14, it meets the tapered dividing element 64, and such gases are divided generally into upper and lower strata. The lower stratum naturally contains the major portion of the heavier particles, such as metallic lead, metallic zinc, and lead-oxide, while the upper stratum contains the major portion of the lighter particles, such as zinc-oxide and also the sulphur dioxide gas. The upper stratum enters the forward pan 41 and impinges against the deflector 49, and the major portion of the solid particles are deposited within this pan, while the gases travel forwardly through the screen 48, which serves to retard the travel of the gases, to a considerable extent, and also filter out some of the solid particles remaining therein and to divide the volume of the gas. The gases are compelled to travel over the top of the deflector 49, and hence this permits that portion of the gases below this top to become more or less quiet, aiding in the settling out of the particles. When a sufficient amount of particles have accumulated upon the bottom of the tray 41, and some of these particles may also accumulate on the top of the deflector 49, such tray may be removed and the contents dumped and the tray returned to its position. The gases in the upper stratum passing through the screen 48 of the tray 41, then pass longitudinally into the tray 55, and travel in the top of this tray, and by contact with the imperforate side 58 are deflected downwardly and forwardly, and then pass through the screen 66. The gases, upon being reversed in the tray 55, deposit therein some of their particles. The gases in the lower stratum enter the pan 60, and impinge against the deflector 49 thereof, thus separating out the major portion of the solid particles in a similar manner as hereinbefore described. Some of these gases then pass rearwardly over the top of the deflector through the screen 48 of the pan 60, and some of the gases pass upwardly through the screen 63 of the pan 60, and comingle with the gases traveling forwardly from the pan 55, and, with these gases, pass through the screen 66. The upper stratum of the gases contacts with the imperforate plate 67 and is deflected downwardly, and meets the lower stratum which enters the pan 61, where separation of some of the particles occur, in a similar manner heretofore described. Some of the gases pass in the lower stratum through the screen 48 of the pan 61 and the upper stratum of gases passes upwardly through the screen 63 of part 61. A portion of this upper stratum of gases passes through the screen 68, and a portion of the same enters the upper pan 56, and separation occurs in this upper pan. The gases passing through the screen 68 meet the imperforate wall 69 and is deflected downwardly to comingle with the gases passing through the screen 48 of the pan 61, and enters the pan 62, where further separation of the particles occur. The gases entering the pan 62 have a portion thereof pass through the screen 48 of the same and a portion of these gases passes upwardly through the screen 63 of the pan 62 and comingles with the gases from the pan 56 and these gases enter the rearmost pan 57. In this pan, the gases contact with the double deflectors 49 and 59, in which further separation of the particles occurs, and then passes through the screen 48 of the pan 57 and discharges from the rear end of the casing 14, with the gases from the screen 70 and the pan 62. By this process, substantially, all of the solid particles are separated out from the gases. These gases may still contain sulphur-dioxide gas and the gases now pass through the pipe 29 into the atomizing shell 34, and are sprayed through the water in the tank 33, containing the quicklime or other chemicals. The sulphur-dioxide or others are converted into sulphur salts or neutral salts, which settle in the bottom of the tank. The remaining are neutral gases which are substantially pure oxygen, passes through the water and escapes through the stack 38. This escaping gas will then not be injurious to animal or plant life or soils. It might be stated that when the apparatus is made quite large, it may be necessary to divide each tray into two sections, and have one section extending through each side of the casing 14.

The deflectors in the trays or compartments serve to retard the gases, and direct the solid particles downwardly. The screens of the trays serve to filter out the particles to some extent, but serve principally to finally divide the volume of gases, whereby the particles will more readily separate out when entering the sundry trays.

It is to be understood that the form of my invention herein shown and described is to be taken as a preferred embodiment of the same, and that various changes in the shape, size and arrangement of the parts, may be resorted to, without departing from the spirit of my invention or the scope of the subjoined claims.

Having thus described my invention, I claim:

1. In apparatus of the character described, a compartment provided adjacent to one of its ends with an inlet opening and adjacent to its opposite end with a screened outlet opening, the outlet opening being spaced from the top of the compartment, a screen covering the top of said compartment, a curved inclined deflector arranged within said compartment adjacent to and in advance of the screened opening to cover the same, the top of the deflector being spaced laterally from the screened opening, said deflector serving to deposit the fine particles contained within the gases upon the bottom of said compartment, and means to pass gases through the compartment.

2. In apparatus of the character described, a casing, a plurality of sets of compartments arranged within the casing at different elevations, each compartment having an inlet and an outlet, a screen covering the outlet, a deflector arranged within each compartment adjacent to the outlet and in advance of the screen, said deflector serving to deposit fine particles contained in the gases upon the bottom of its compartment, and means whereby the gases pass from certain compartments in one elevation to certain compartments in the other elevation and also pass from certain compartments in one elevation to other compartments in the same elevation.

3. In apparatus of the character described, a casing, a plurality of sets of compartments arranged at different elevations therein, each compartment having an inlet and an outlet, a screen covering the tops of each compartment in the lower set, and means whereby gases pass downwardly from certain compartments in the upper set to certain compartments in the lower set and upwardly from certain compartments in the lower set to certain compartments in the upper set.

4. In apparatus of the character described, a casing, a lower set of spaced compartments arranged therein, each compartment having an inlet and an outlet, a screen covering the outlet, an inclined deflector arranged within each compartment adjacent to its outlet and in advance of the screen, said deflector serving to deposit fine particles contained in the gases upon the bottom of said compartment, an upper set of compartments arranged within the casing, all of said compartments in the upper set excepting one having an inlet and an outlet and a screen covering the outlet and an inclined deflector within the compartment adjacent to its outlet and in advance of the screen, said deflector serving to deposit fine particles contained in the gases upon the bottom of the deflector, the remaining compartment in the upper set having an opening at its rear end and having its forward end closed, imperforate partitions arranged between the rear ends of the upper compartments and the forward ends of the lower compartments, screen partitions arranged between the forward ends of the upper compartments and the rear ends of the lower compartments, screens covering the tops of the lower compartments, and means to feed the gases into the forward end of the casing.

In testimony whereof I affix my signature.

MOORE M. REYNOLDS.